United States Patent [19]

Sato

[11] 4,384,389
[45] May 24, 1983

[54] ROPE-CHAINING DEVICE

[76] Inventor: Soichiro Sato, 538, Oaza-kunozone Sakae Minamikanbaragun, Niigata-ken, Japan

[21] Appl. No.: 226,105

[22] Filed: Jan. 19, 1981

[30] Foreign Application Priority Data

Oct. 6, 1980 [JP] Japan ................................. 55-142391

[51] Int. Cl.³ ............................................. F16G 11/04
[52] U.S. Cl. ............................... 24/136 K; 24/115 M; 403/211
[58] Field of Search ............ 24/115 M, 136 R, 136 K, 24/136 B, 136 L; 403/210, 211, 213, 16

[56] References Cited

U.S. PATENT DOCUMENTS

| | | | |
|---|---|---|---|
| 1,355,004 | 10/1920 | Sandford | 24/136 K |
| 2,372,754 | 4/1945 | Wickens | 24/136 K |
| 2,540,887 | 2/1951 | Hyatt | 24/115 M |
| 2,827,680 | 3/1958 | Gibson | 403/211 |
| 2,838,819 | 6/1958 | Falkenstein | 403/211 |
| 4,313,243 | 2/1982 | Childress et al. | 24/115 M |

FOREIGN PATENT DOCUMENTS

| | | | |
|---|---|---|---|
| 357679 | 1/1906 | France | 24/136 K |
| 123388 | 6/1919 | United Kingdom | 403/213 |
| 525426 | 8/1940 | United Kingdom | 403/210 |
| 724841 | 9/1978 | U.S.S.R. | 24/115 M |

Primary Examiner—Paul J. Hirsch
Attorney, Agent, or Firm—Schwartz & Weinrieb

[57] ABSTRACT

A rope-chaining device is formed consisting of a screw bar screwed into one side of acceptor, and an arcuately-shaped plate is provided rotatably at the end portion of the screw bar within the acceptor. A rope-fixing member is disposed within the acceptor and a wedge having a longitudinal hole defined therein is disposed within the rope-fixing member. A pivot penetrates the long hole so that the rope-fixing member may be pivotally mounted within the acceptor, and upon the wedge a rope is wound to be fastened tightly, an arcuately-shaped plate being pressed to the rope.

11 Claims, 6 Drawing Figures

ROPE-CHAINING DEVICE

FIELD OF THE INVENTION

This invention relates to a rope-chaining device, specifically to a wire rope-chaining device used for a turnbuckle.

BACKGROUND OF THE INVENTION

As prior art, rope-chaining apparatus have been known in which the end of a rope is bound in a ring with which a shackle is engaged, which also includes a headed or angular headed bolt.

These chaining apparatus, however, were easy to be broken at the bound part of the ring. Furthermore, the rope easily moved thereby engaging the shackle or bolt head, which caused the rope to loosen. In addition, it often took too long time a bind the rope.

OBJECTS OF THE INVENTION

It is a primary object of the present invention to provide a rope-chaining device which need not be bound in the ring at the end of the rope, and the rope does not move in the engaged conditions.

It is another object of the present invention to fasten strongly the engagement of a rope by the principle of a wedge. In addition, the pressing method for the wedge to engage the rope deeply is provided which makes chaining of the rope stronger, and a rope-chaining member of easy chaining operation is also provided.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Figure 1:
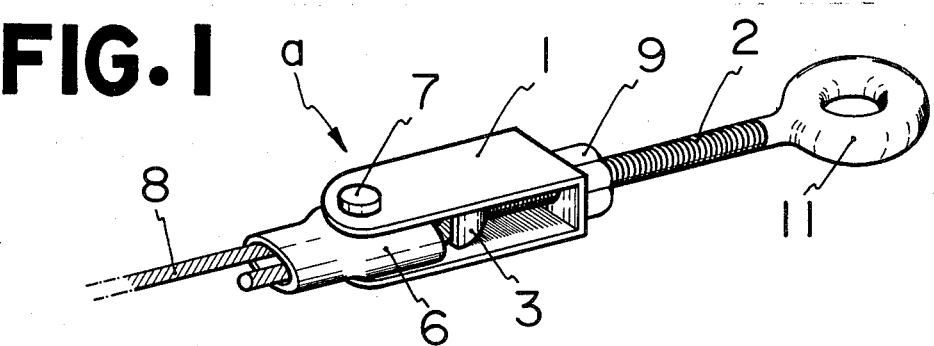
FIG. 1 is a perspective view of the rope-chaining device of the present invention.
Figure 3:
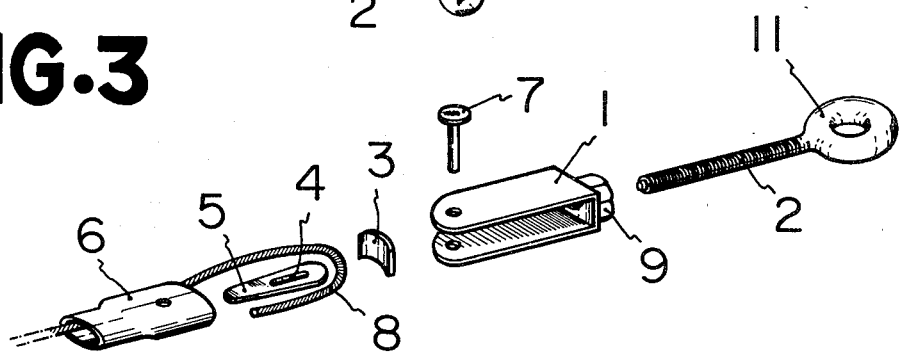
FIG. 3 is an exploded view of the rope-chaining device.
Figure 4:
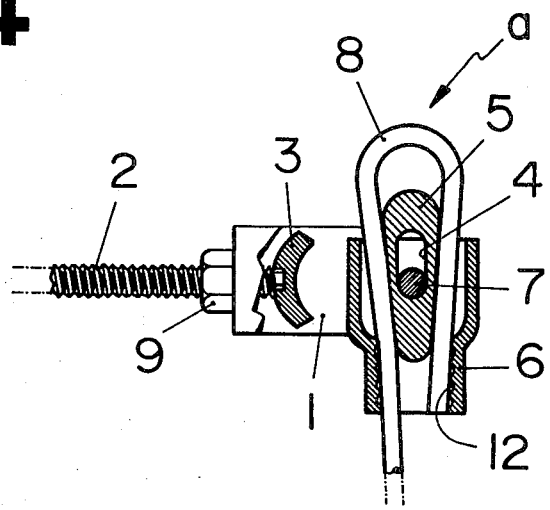
FIGS. 4, 5 and 6 are cross-sectional views showing the chaining conditions in steps.
Figure 5:
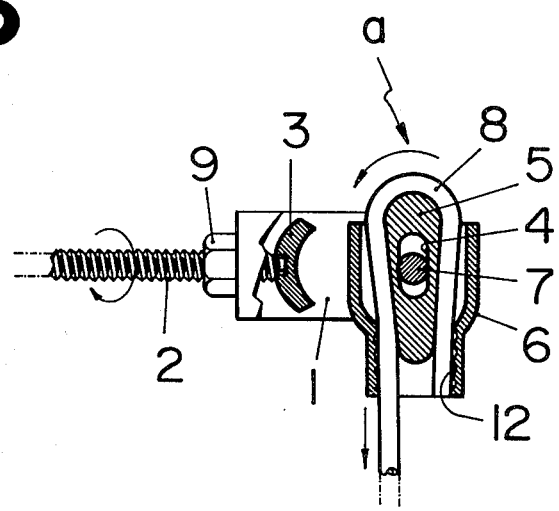
Figure 6:
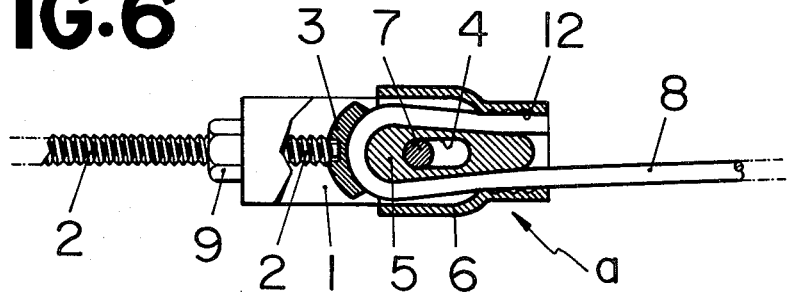

As shown in the perspective views of FIGS. 1 and 3, from the external side of one end of a U-shaped acceptor 1 a threaded eye bolt 11 having a threaded shaft or screw bar 2 is threaded inserted therein, and at the other end of the screw bar 2, an arcuately-shaped plate 3 is rotatably provided. On the other end of the acceptor 1, a rope fixing member 6 is pivotably provided, and within this rope fixing member 6, a wedge member 5 is disposed which has an elongated slot 4 defined therein. A pivot shaft 7 is provided so as to pivotally mount the rope fixing member 6 and wedge member 5 within acceptor 1, and on both sides of the wedge member 5 and within rope retaining member 6, a rope 8 is looped and tightly fastened. In FIGS. 4 through 6, this can be more clearly appreciated. In the drawings the cross section of the acceptor 1 is formed almost in the flat form, and on one side of the acceptor 1 a nut 9 is provided through which screw bar 2 is threaded engaged.

Figure 2:
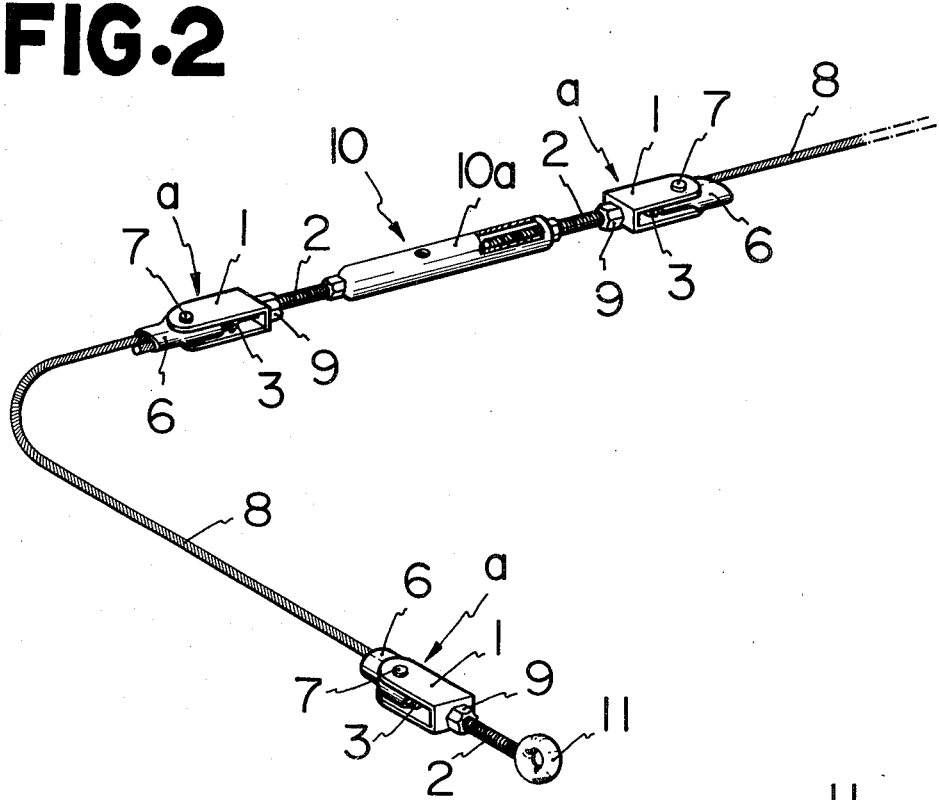
FIG. 2 is a perspective view of the rope-chaining device used for a turnbuckle.

As shown in the FIG. 2, in case that this invention is utilized in connection with a turnbuckle, the head or eye portion 11 is not necessary to be provided to the screw bar 2, but in other cases a round head 11 or angular head may be provided. Rope-fixing member 6 is a flat hollow body with its proximal portion slightly narrowed, and inside of which an uneven or roughened surface 12 to stop slipping is provided.

First of all, in connection with the fastening of the rope member 8 as shown in FIG. 4, rope-fixing member 6 is rotated a position perpendicular to the longitudinal direction of the acceptor 1. The wedge 5 is pushed up to the upper part of rope-fixing member 6 through the medium of the elongated slot 4, then a rope 8 is inserted from one side of the rope-fixing member 6, and after being looped around the top of wedge 5, is pulled out downwardly through the other channel within rope-fixing member 6 as defined between members 5 and 6. Next, as shown in FIG. 5, a rope is pulled tight into engagement with the wedge 5 and the rope 8 and wedge member 5 are moved as far as possible into the rope-fixing member 6 through the medium of the elongated slot 4. Lastly as shown in FIG. 6, the rope-fixing member 6 is rotated so as to be coaxial with the longitudinal direction of acceptor 1. Subsequently, the screw bar 2 is threadedly engaged within acceptor or housing 1, and presses the arcuately-shaped plate 3 toward the rope thus further pressing the wedge 5 and the rope 8 into the rope fixing member 6 so as to fix them in a pressed conditions within member 6. As a rope 8 is wound around the wedge member 5 after being pushed up through the medium of the elongated slot 4, on both sides of the wedge 5 relative to member 6, relatively large openings or channels are formed and the rope can be wound or looped easily and smoothly.

Moreover, when the rope is pulled and strained, the wedge 5 is pulled down through the medium of slot 4, and the rope goes into member 6 deeply by the principle of the wedge and is tightly secured or chained with the chaining-device generally designated by the reference character a. This chaining force is further increased by the pressing of the arcuately-shaped plate 3 as well as the friction of the uneven surface 12 inside the rope-fixing member.

In applying the chaining device a of the present invention to a turnbuckle 10, it is preferable that the arcuately-shaped plate 3 of device a be threadedly engaged relative to the turnbuckle body 10a for the rope 8 to be tightly fastened.

The chaining device of the present invention can be utilized as a chaining device with a round head which belongs to a turnbuckle 10 of FIG. 2, and also can be used independently with screw bar 2 stopped at a desirable insertion length relative to acceptor 1. This invention need not bind a rope 8 in ring form but only wind a rope 8 around a wedge 5, so it is simple in handling. As the chained rope 8 is strongly fastened to the chaining device a, it does not loosen or move greatly by the outer pressure of wind or rain. It is only required that a rope 8 is wound around a wedge 5, and then a rope-fixing member 6 is rotated through 90°, and by screwing in the screw bar 2 the arcuately-shaped plate 3 is pressed to the rope 8, the chaining device is very easily handled. An arcuately-shaped plate is rotatably provided at the end of screw bar which is screwed in one side of an acceptor, and a wedge having a long longitudinal hole is inserted into a rope-fixing member which is put in the other side of the acceptor. Into the long hole a pivot is penetrated to pivotally connect the rope-fixing member to the acceptor, and a rope is wound around the wedge to be tightly fastened and the arcuately-shaped plate is pressed to the rope. Obviously, many modifications and variations of the present invention are possible in light of the above teachings. It is therefore to be understood that within the scope of the appended claims, the present invention may be practiced otherwise than as specifically described herein.

I claim:

1. A rope-chaining device, comprising:

a base member;

a rope-retaining housing pivotably mounted upon said base member between a first rope-insertion position and a second rope-securing position;

means movable within said rope-retaining housing, for defining with said rope-retaining housing a looped path for a rope within said housing, between a first position for facilitating the insertion of said rope within said housing and a second position for securing said rope within said housing; and means mounted upon said base member for moving said movable means of said housing from said first position to said second position when said rope-retaining housing is disposed within said second rope-securing position.

2. A rope-chaining device as set forth in claim 1, wherein:

said means movable within said rope-retaining housing comprises a wedge-shaped member.

3. A rope-chaining device as set forth in claim 2, wherein:

said wedge-shaped member includes an elongated slot for permitting said movement of said wedge-shaped member between said first and second positions.

4. A rope-chaining device as set forth in claim 1, wherein:

said means mounted upon said base member comprises a threaded screw-bar extending through one end of said base member.

5. A rope-chaining device as set forth in claim 4, wherein:

said screw-bar includes an arcuate plate disposed upon the end of said screw-bar which is disposed interiorly of said base member for engagement with said rope and said means movable within said rope-retaining housing.

6. A rope-chaining device as set forth in claim 4, wherein:

the free end of said screw bar disposed exteriorly of said base member is provided with a head having either a circular, angular, or hooked configuration.

7. A rope-chaining device as set forth in claim 4, wherein:

the free end of said screw bar is disposed within a turnbuckle mechanism.

8. A rope-chaining device as set forth in claim 2, wherein:

said housing has a stepped configuration for cooperation with said wedge-shaped member.

9. A rope-chaining device as set forth in claim 2, wherein:

said housing further comprises a roughened surface portion for cooperation with said wedge-shaped member for securing said rope within said housing between said roughened surface portion of said housing and said wedge-shaped member.

10. A rope-chaining device as set forth in claim 4, wherein:

said base member has a nut integrally secured thereon for threadedly receiving said screw-bar.

11. A rope-chaining device as set forth in claim 1, wherein:

said base member is fabricated from sheet metal and is open along at least one side thereof to permit said pivotable movement of said housing relative to said base member for achieving said insertion of said rope within said housing.

* * * * *